Jan. 26, 1926.  W. H. SCHMIDT  1,570,925
TWO-SPEED POWER UNIT
Filed Oct. 4, 1924    2 Sheets-Sheet 2
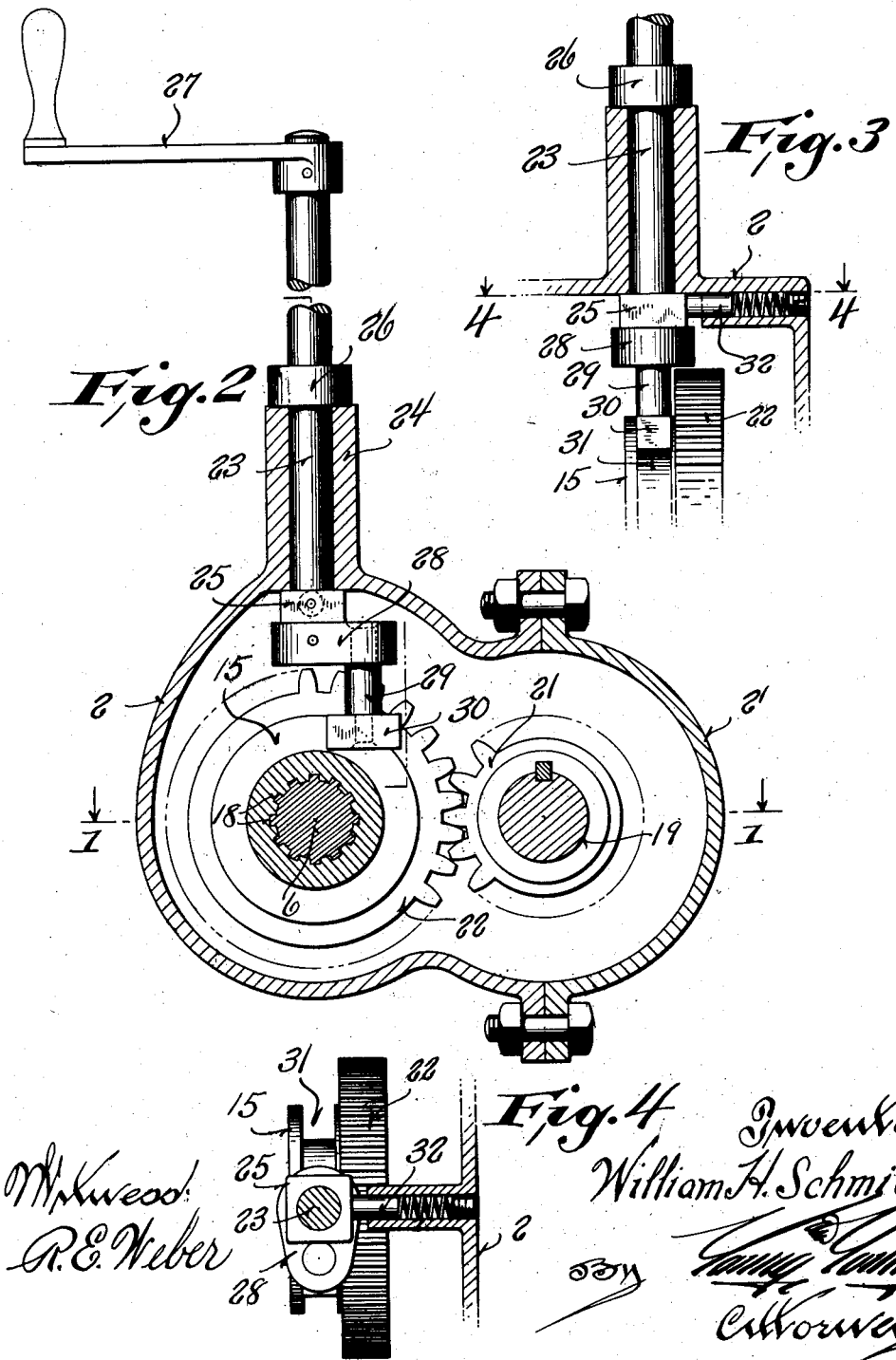

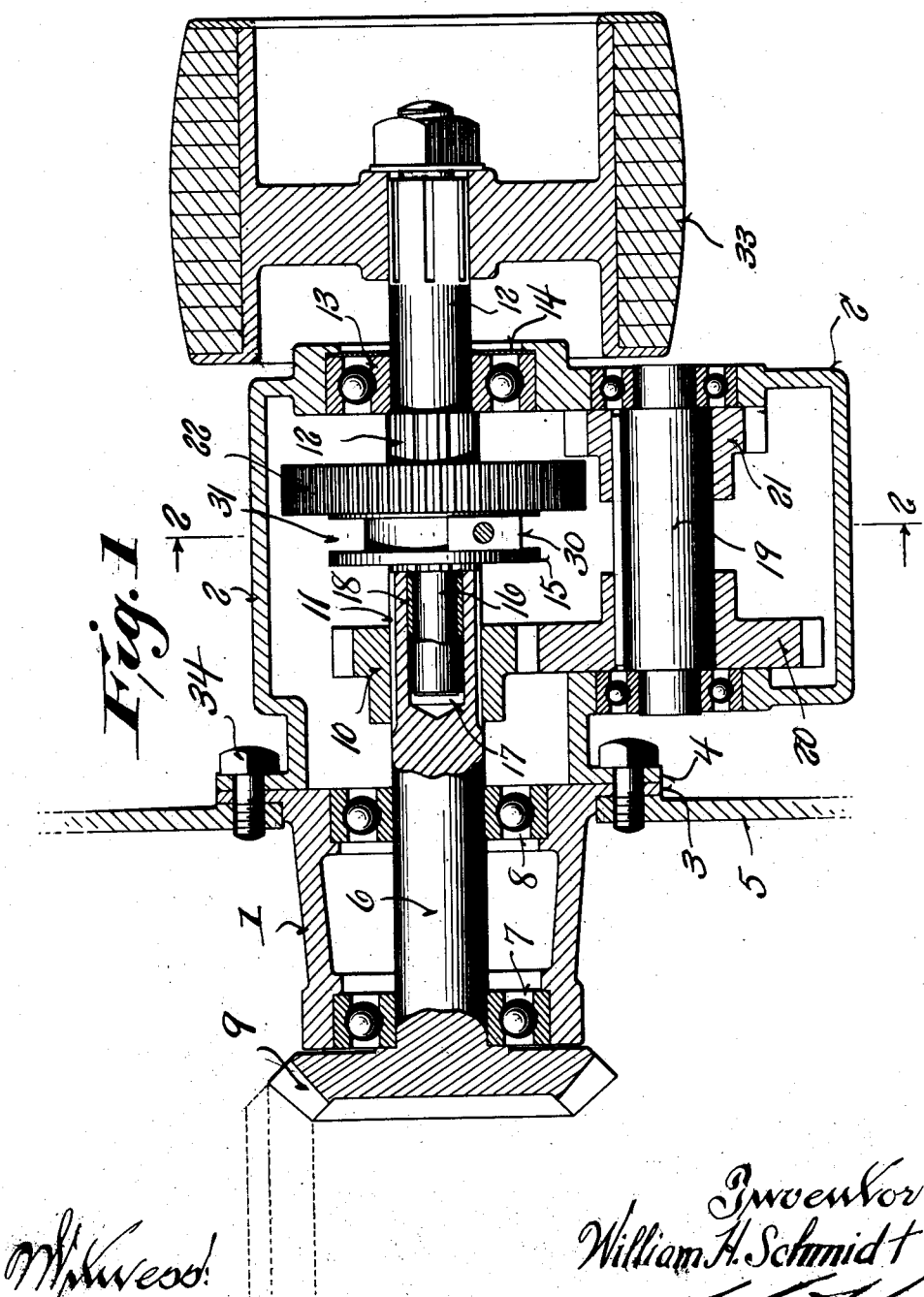

Patented Jan. 26, 1926.

1,570,925

UNITED STATES PATENT OFFICE.

WILLIAM H. SCHMIDT, OF MILWAUKEE, WISCONSIN.

TWO-SPEED POWER UNIT.

Application filed October 4, 1924. Serial No. 741,615.

*To all whom it may concern:*

Be it known that I, WILLIAM H. SCHMIDT, a citizen of the United States, and resident of Milwaukee, in the county of Milwaukee and State of Wisconsin, have invented certain new and useful Improvements in Two-Speed Power Units; and I do hereby declare that the following is a full, clear, and exact description thereof.

This invention relates to a two speed power unit, and is particularly directed to a power unit for a belt pulley control adapted to be connected with the power shaft of a tractor, and to control the operation of the pulley gear or chain drive by which the power from the tractor may be employed for operating stationary machinery.

Objects of this invention are to provide a power unit which may be attached as an entity to the casing of a tractor which is itself provided with a casing so formed that it houses the control mechanism, which is provided with an inner part adapted to project into the tractor casing and to support the driving shaft of the unit, which is provided with an outer part, which carries a driven shaft upon which the driving pulley is mounted, and which has a control adapted for manual operation, which is designed to control the coupling of the driven or pulley shaft with the driving shaft either directly or through a set of intermediate reduction gears.

Further objects are to provide a belt pulley gear or chain control for tractors which is of simple and substantial construction, which is compact, which may be readily applied and which is provided with an adjusting crank mounted for manual operation outside of the casing of the power unit, and so organized that it will lock and remain in any one of a plurality of positions of adjustment corresponding to full speed and reduced speed of the driving pulley and to neutral or open position.

An embodiment of the invention is shown in the accompanying drawings, in which:—

Figure 1 is a horizontal sectional view through the control unit, such view corresponding to a section on the line 1—1 of Figure 2.

Figure 2 is a vertical sectional view on the line 2—2 of Figure 1.

Figure 3 is a sectional detail of the locking mechanism for the hand crank.

Figure 4 is a sectional view taken on the line 4—4 of Figure 3.

The unit comprises a main casing having an inner portion 1, and an outer portion 2. These portions are provided with cooperating flanges 3 and 4, respectively, adapted to be bolted directly to the casing 5 of the tractor. The inner casing carries the driving shaft 6 of the unit, and such shaft is preferably supported adjacent its inner and outer ends by means of ball bearings 7 and 8, respectively. The inner end of the driving shaft 6 is provided with a bevel gear 9 adapted to be driven from the power shaft of the tractor. The outer end of this driving shaft of the unit is provided with a fixedly mounted driving pinion 10 and is also provided with a splined portion 11.

The driven shaft 12 projects through the outer wall of the outer casing 2, and is carried in a ball bearing 13 provided with a shield plate 14, as may be seen from Figure 1, to prevent either the exit of oil or the entrance of grit. This driven shaft 12 is arranged in juxtaposed relation to and in alignment with the driving shaft 6. It is provided with a splined portion 12 which corresponds identically with the splined portion 11 of the driving shaft.

A collar 15 is slidably mounted upon the driven shaft 12 in splined relation thereto and is adapted to be slid into engagement with the splined portion 11 of the driving shaft, when it is desired to directly connect the two shafts.

One of the shafts, for instance the driven shaft 12 is provided with an extension 16 which fits within an apertured portion or socket portion 17 of the other shaft. If desired, a bearing bushing 18 may be provided, as shown in Figure 1.

A jack shaft 19 is suitably mounted in ball bearings within a lateral extension 2' of the casing 2 (as may be seen from Figures 1 and 2), and carries a driven gear 20 meshing with the driving pinion 10 and also a driving pinion 21. The collar 15 has unitarily formed therewith a driven gear 22 adapted, under predetermined conditions, to mesh with the driven pinion 21, and to thus connect the driven shaft 12 to the driving shaft 6 through reduction gearing.

From reference to Figure 1, it will be at once apparent that this reduction coupling may be secured by shifting the sleeve 15 and its gear 22 to the right in such figure,—the sleeve and gear being shown in neutral position in Figure 1.

The means for operating the sleeve 15 may comprise a rock shaft 23 (see Figure 2) carried in an extended bearing 24 formed upon the casing 2. This rock shaft is provided with a square portion or collar 25 adjacent its inner end, and with a collar 26 upon the outer side of the bearing 24 to maintain the shaft in correct position. It is provided with a manipulating crank 27 at its outer end, and with a smaller crank 28 at its inner end. This smaller crank has a crank pin 29 which pivotally carries a rectangular block 30. This rectangular block fits within a rectangular groove 31 formed in the sleeve 15 (see Figures 1, 3 and 4).

A spring pressed plunger 32 is carried by the casing 2 and has a flat face adapted to contact with any one of the flat faces of the square collar 25, as may be seen from Figures 3 and 4. This plunger thus yieldingly holds the rock shaft 30 in any one of several adjusted positions corresponding to the three positions of the sleeve 15.

It is, of course, to be understood that the pulley 33, rigidly mounted upon the outer end of the driven shaft 12, may be, obviously, replaced by any type of driving means by which the driven shaft may be coupled with the load and such pulley is to be understood as being merely representative of any of several means.

It is to be seen that a simple and unitary structure has been provided which is designed to adapt the power pulley of a tractor for a two speed control. It will further be seen that this device may be bolted as an entity directly to the main casing 5 of the tractor, as shown in Figure 1, by means of bolts 34 passing preferably through both the flanges 3 and 4 of the unit, such bolts serving in the dual capacity as connectors between the two main portions of the unit, and between such unit and the tractor casing.

It will further be seen that the manually controlled rock shaft and hand crank are automatically retained in any of several adjusted positions, and that further, such shaft may be most readily manually operated to disconnect the pulley from the power shaft of the tractor or to operatively connect the pulley in either of two speed ratios thereto.

Although the invention has been described in considerable detail, it is to be understood that the invention may be variously embodied and is, therefore, to be limited only as claimed.

I claim:

1. A two speed power unit for tractors comprising a two part casing, a driving shaft carried by one portion of said casing and supported adjacent the inner and outer ends of said portion, a driven shaft carried by the other portion of said casing and projecting through the outer wall of such portion and aligning with said driving shaft, said shafts having mutually cooperating means for mutually supporting the adjacent ends thereof, said shafts having a plurality of keys formed thereon at their juxtaposed portions, a sleeve splined to the keyed portions of said shafts and slidably mounted thereon, said sleeve adapted to be carried wholly by said driven shaft when in neutral position and adapted to directly connect said shafts when moved into a position overlapping both shafts, a jack shaft mounted parallel to said shafts, reduction gearing connecting said jack shafts and said driving shaft, a driving pinion rigidly carried by said jack shaft, a driven gear rigidly carried by said sleeve and adapted to mesh with said driving pinion when said sleeve is moved to its outermost position upon said driven shaft, a rock shaft projecting through said casing and having a crank portion operatively connected with said sleeve and adapted to shift said sleeve to any one of several positions, and means for holding said rock shaft in any one of its adjusted positions.

2. A two speed power unit for tractors, the combination of a casing adapted for attachment to said tractors and having shiftable mechanism therein including a gear provided with a slot in its hub, a rod extending through said casing and having an elongated bearing therein, an operating crank on the outer end of said rod, a smaller crank on the inner end of said rod, said smaller crank having a projecting pin, a shoe carried by said pin and fitting within said groove, said shaft having a squared portion located within said casing, and a spring pressed plunger carried by said casing and bearing against said squared portion.

In testimony that I claim the foregoing I have hereunto set my hand at Milwaukee, in the county of Milwaukee and State of Wisconsin.

WILLIAM H. SCHMIDT.